United States Patent
Donaldson (10) Patent No.: US 6,629,373 B1
(45) Date of Patent: Oct. 7, 2003

(54) METROLOGICAL INSTRUMENT

(75) Inventor: James Andrew Donaldson, Leicester (GB)

(73) Assignee: Taylor Hobson Limited (GB)

( * ) Notice: Subject to any disclaimer, the term of this patent is extended or adjusted under 35 U.S.C. 154(b) by 0 days.

(21) Appl. No.: 09/959,995

(22) PCT Filed: May 12, 2000

(86) PCT No.: PCT/GB00/01828
§ 371 (c)(1),
(2), (4) Date: Nov. 14, 2001

(87) PCT Pub. No.: WO00/70301
PCT Pub. Date: Nov. 23, 2000

(30) Foreign Application Priority Data

May 14, 1999 (GB) .............................. 9911303

(51) Int. Cl.$^7$ ................................. G01B 5/20
(52) U.S. Cl. ............................. 33/551; 33/503
(58) Field of Search ............... 33/503, 533, 551, 33/556, 558, 553, 554; 340/680, 686.1, 870.01, 870.16

(56) References Cited

U.S. PATENT DOCUMENTS

| | | | | |
|---|---|---|---|---|
| 5,016,199 A | * | 5/1991 | McMurtry et al. | 33/503 |
| 5,056,235 A | * | 10/1991 | Thomas | 33/503 |
| 5,058,433 A | * | 10/1991 | Wilson et al. | 33/561 |
| 5,150,529 A | * | 9/1992 | Collingwood | 33/503 |
| 5,777,562 A | | 7/1998 | Hoffman | 340/870.07 |
| 5,778,550 A | | 7/1998 | Carli et al. | 33/503 |
| 5,884,410 A | | 3/1999 | Prinz | 33/559 |
| 6,141,884 A | * | 11/2000 | Correns et al. | 33/503 |
| 6,301,796 B1 | * | 10/2001 | Cresson | 33/556 |
| 6,442,857 B1 | * | 9/2002 | Atsuhiko et al. | 33/553 |

FOREIGN PATENT DOCUMENTS

| | | |
|---|---|---|
| EP | 0 335 474 | 10/1989 |
| GB | 2 319 616 | 5/1998 |

* cited by examiner

Primary Examiner—G. Bradley Bennett
(74) Attorney, Agent, or Firm—Finnegan, Henderson, Farabow, Garrett & Dunner, L.L.P.

(57) ABSTRACT

There is described a metrological instrument for measuring a characteristic of a surface of a workpiece, the instrument comprising a measurement unit and a user-interface unit separate from the measurement unit. The measurement unit has a sensor which follows a measurement path across a surface and means for deriving a signal indicative of a characteristic of the surface as the sensor follows the surface. The user-interface unit has means for providing a user with an indication of a surface characteristic measured by the sensor. The measurement unit and the user-interface unit have communication means for enabling remote communication of information relating to a measurement between the measurement and user-interface units. Preferably, the measurement unit and the user-interface unit can be connected together when not in use in a manner such that the sensor of the measurement unit is protected.

53 Claims, 6 Drawing Sheets

METROLOGICAL INSTRUMENT

The present invention relates to a metrological instrument for measuring one or more surface characteristics such as form, for example roundness, and/or roughness or surface texture.

An example of such a metrological instrument is the SURTRONIC 10 manufactured by Taylor Hobson Limited, of Leicester, England, UK. The SURTRONIC 10 is a pocket-sized device which can be used on the shop floor for in-situ measurement of surface texture. The user simply places the SURTRONIC 10 on the surface to be measured and, at the press of a button, a single number which is indicative of the surface characteristic being measured is displayed.

When the SURTRONIC 10 is placed on a workpiece surface whose texture is to be measured and is then activated, the tip of a stylus is traversed along a measurement path across the surface. The stylus is pivotally mounted so as to enable the stylus tip to follow changes in the surface due to its texture or roughness. The stylus is connected to a piezoelectric transducer which generates charges in response to the pivotal movement of the stylus. The charges generated by the piezoelectric transducer are processed to provide a measurement of the surface roughness or texture which is displayed on a screen.

The SURTRONIC 10 has found wide applicability for the measurement of surface characteristics. However, the Surtronic 10 can be difficult to use where the surface to be measured is difficult for the user to access. Also, protection of the stylus tip from damage when not in use can be a problem and requires the provision of a special sliding gate which has to be manually opened for measurement and closed for storage.

In one aspect, the present invention provides a metrological instrument having a measurement unit arranged to communicate remotely without physical connection to a user-interface unit.

According to one aspect of the present invention, there is provided a metrological instrument comprising the measuring unit and a user-interface unit, the measuring unit and the user-interface unit being separable and being arranged to communicate with one another remotely without any physical connection therebetween, at least when the units are separated. The user interface may comprise at least one of a display and a control unit operable by a user. The remote link may be an infra-red link.

According to one aspect of the present invention, there is provided a metrological instrument comprising a measurement unit and a further unit with the units being arranged to be coupled together in a first configuration in which the measurement unit is allowed to carry out a measurement and in a second configuration in which the measurement unit is protected or covered by the further unit. Preferably, the further unit comprises a user interface unit which may comprise at least one of the display and a control unit for the instrument.

According to one aspect of the present invention, there is provided a metrological instrument comprising: a measurement unit having a pivotally mounted stylus carrying a stylus tip for traversing a surface to be measured, means for traversing the stylus tip along a traverse path across the surface tip in measured and a transducer for providing a signal indicative of pivotal movement of the stylus as the stylus tip traverses the surface; and a user-interface unit for providing a user with a result representative of a characteristic of the surface being measured and derived from the transducer signal, the measurement and user-interface units being separable and being arranged to be coupled together in a first configuration in which the measurement unit is allowed to carry out a measurement and a second configuration in which the stylus tip is protected by the user-interface unit.

In another aspect, the present invention provides a measurement unit for a metrological instrument, the measurement unit having means for communicating remotely, for example by infra-red radiation, with a user-interface unit of the instrument.

In another aspect, the present invention provides a user interface unit for a metrological instrument, the user interface unit having means for communicating remotely, for example by infra-red radiation, with a measurement unit of the metrological instrument.

In another aspect, the present invention provides a measurement unit for a metrological instrument, the measurement unit being arranged to be coupled to a user interface unit of the metrological instrument in at least two different configurations with the measurement unit being capable of carrying out a measurement when the units are coupled in a first configuration and being protected against damage when the units are coupled in a second configuration.

In another aspect, the present invention provides a user-interface unit for a metrological instrument, the user-interface unit being connectable to a measurement unit in at least two different configurations with, in a first configuration, the measurement unit being allowed to carry out a measurement and in a second configuration the measurement unit being protected against damage by the user-interface unit.

In a metrological instrument embodying invention, the ability to communicate remotely, that is without physical connection, to a user interface allows the measurement unit to be placed in location that would be difficult to access if the measurement unit was permanently connected to the user interface. Also, the fact that the remote communication is achieved without any physical link between the two units means that the user can reposition or handle the user interface unit after the measurement unit has been placed at the desired measurement location without effecting the position of the measurement unit.

According to one aspect of the present invention, there is provided a metrological instrument for measuring a characteristic of a surface of a workpiece, said metrological instrument having a control unit and a traverse unit, said control unit comprising a user interface and said traverse unit comprising means for generating a signal representative of the characteristic of the surface, wherein the control unit and the traverse unit are adapted such that a signal from the control unit can initiate the measurement of the surface characteristic by the traverse unit by remote control. By establishing a remote control link between the traverse unit and the control unit, once the control unit has been placed on the surface to be measured, the user can initiate a measurement as and when desired without needing to directly access the traverse unit.

The terms "remote communication" and "remote control" as used above cover the case where signals are transmitted between the user interface or control unit and measurement or traverse unit without a physical link between the unit, that is there is no wire, optical fibre or the like physically connecting the control unit to the traverse unit. This means that the user can move or adjust the control unit without affecting the positioning of the traverse unit.

In an embodiment, said control unit and said traverse unit comprise infra-red transmission and reception circuitry to provide the remote link. The use of infrared rather than radio (RF) transmission is advantageous because of the lower cost and lower susceptibility to interference.

In an embodiment, said user-interface or control unit and said measurement or traverse unit both include an integrated circuit comprising modulation circuitry, transmitter driver circuitry and a transmitter to provide transmission circuitry and a receiver and demodulator to provide reception circuitry, thereby reducing size and, in the case of mass production particularly, cost.

In an embodiment, the measurement or traverse unit has a plurality of receivers are located at different positions on the measurement or traverse unit for communicating with the control or user-interface unit. This enables communication still to occur even if one of the receivers is obscured for some reason. The use of a plurality of receivers is particularly advantageous where communication is effected optically, for example using infra-red radiation, because it improves the possibility of a line-of-sight between a transmitter and receiver being available even if the traverse or measurement unit is positioned in a confined location.

In one aspect of the present invention there is provided a metrological instrument comprising a control unit including a first connection means and a measurement or traverse unit including a second connection means for coupling with the first connection means, the traverse and control unit having data communication means arranged to enable remote communication between the units when the units are separated from one another, the data communication means being arranged such that when the control unit and the measurement or traverse unit are connected via the first and second connection means the data communication means of the control unit is adjacent to the data communication means of the traverse unit. This enables communication between the units to take place in the same manner and using the same communication means when the units are connected together and when the units are separate from one another.

In an embodiment, the traverse or measurement unit comprises a third connection means arranged so that the control unit is connectable to the measurement traverse unit via the first and third connection means such that the measurement or traverse unit is protected by body of the control unit. In an embodiment, the body of the control unit protects a stylus tip of the measurement or traverse unit when the two units are connected via the first and third connection means.

According to one aspect of the present invention, there is provided a metrological instrument for measuring a characteristic of a surface of a workpiece by moving a stylus tip over the surface to be measured, said metrological instrument having a control unit and a traverse unit, said control unit comprising a user interface and a first connector and said traverse unit comprising a stylus arm for holding the stylus tip, means for generating a signal representative of the characteristic of the surface in response to movement of the stylus tip over the surface and a second connector, the control unit and the traverse unit being adapted such that a signal from the control unit can initiate the measurement of the surface characteristic by the traverse unit, wherein the first connector is arranged to engage the second connector to connect the control unit and the traverse unit such that the body of the control unit protects the stylus tip when the apparatus is not in use.

Exemplary embodiments of the present invention will now be described with reference to the accompanying drawings in which.

For exemplary purposes only, the present invention will first be described in the context of a battery-operated metrological instrument which outputs a measure of the surface roughness or texture of a surface of a workpiece on which it is positioned at the press of a button.

Figure 1:
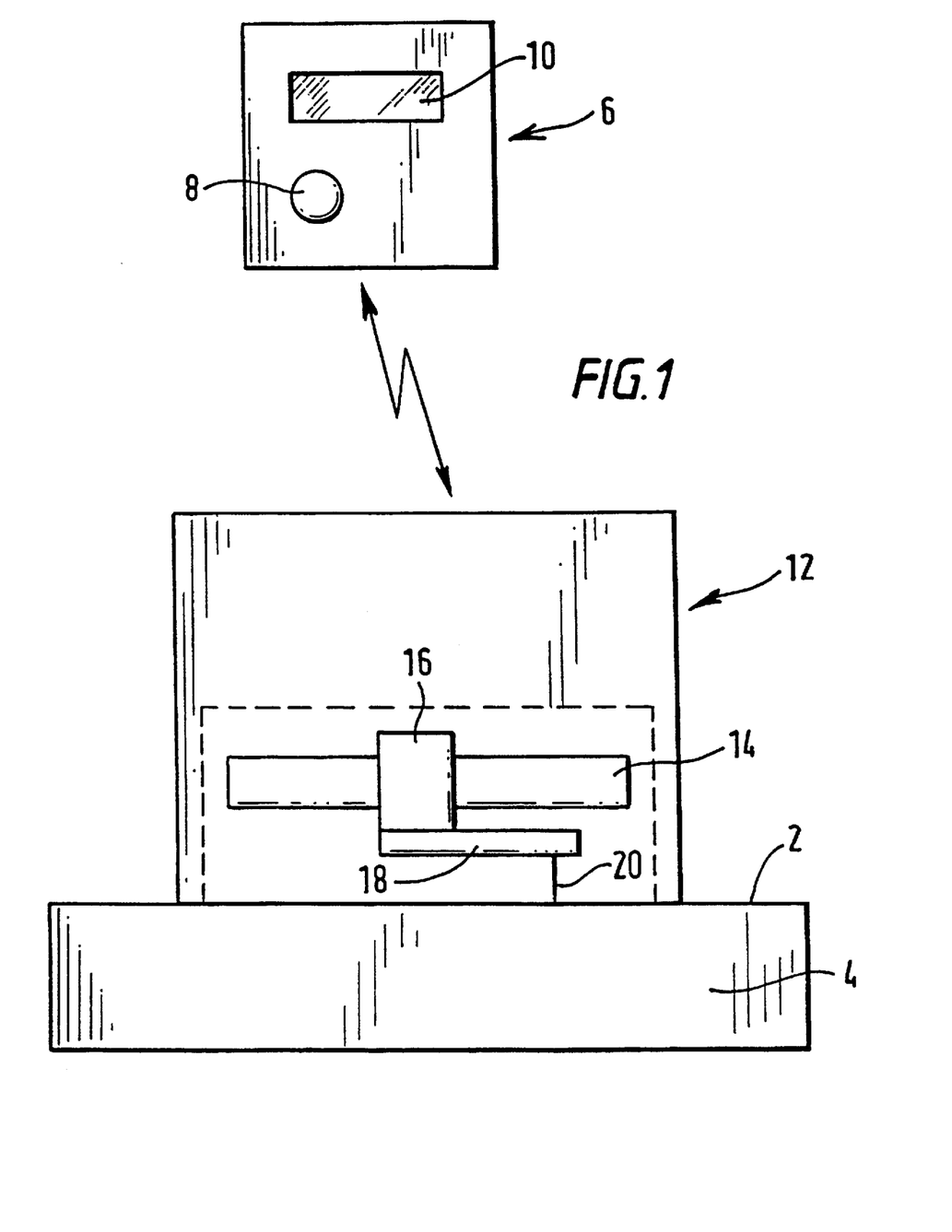
FIG. 1 is a schematic diagram of a first embodiment of a metrological instrument according to the present invention positioned to make a measurement of a surface characteristic of a workpiece.

FIG. 1 shows a metrological instrument consisting of two separate parts, a user interface or control unit 6 and a measurement or traverse unit 12. The traverse unit 12 is placed on the surface 2 of a workpiece 4 to be measured while the control unit 6 is remote from the traverse unit 12. The traverse unit has a datum bar 14 (visible in FIG. 1 via a cut-away portion indicated by dashed lines). A carriage 16 is mounted for movement along the datum bar 14. A stylus arm 18 carrying a stylus tip 20 is pivotally mounted on the carriage 16. The control or user-interface unit 6 comprises a control button 8 and a display 10, generally an LCD (Liquid Crystal Display).

The operation of the metrological instrument according to the present invention will now be described with reference to FIG. 2 which shows the main elements of the circuitry of the control unit 6 and the traverse unit 12.

A surface measurement is initiated by a user instruction via the button 8 which is connected to a processor 30. In response to the pressing of the button 8, the processor 30 sends a signal to a processor 36 located in the traverse unit via an infra-red (IR) communications link. The infra-red communications link is formed by a control unit IR module 32 and a traverse unit IR module 34.

When the traverse unit processor 36 receives the signal from the control unit processor 30 that a measurement is to be made, the traverse unit processor 36 sends a signal to a motor drive circuit 38. The motor drives circuit 38 activates a motor 40 to move the carriage 16 along the datum bar 14 from a start position. While the carriage 16 is moved along the datum bar 14, the stylus tip 20 attached to the pivotable stylus arm 18 is dragged along a measurement or traverse path over the surface. Movement of the stylus tip 20 in response to the roughness of the surface 2 causes the stylus arm to pivot about its pivot axis.

When the carriage 16 reaches the other end of its traverse, the motor 40, under the control of the processor 36, reverses the direction of movement of the carriage 16 and returns the carriage 16 to the start position.

Pivotal movement of the stylus arm 18 is monitored by a gauge 42. In this embodiment the gauge 42 comprises a piezoelectric transducer arranged such that pivotal movement of the stylus arm 18 causes variations in a force applied to a piezoelectric element. As the force varies mutually opposite charges are generated on opposite sides of the piezoelectric element, the sign of the charges depending on whether the force on the piezoelectric crystal is increased or decreased.

The generated charges are applied to a pre-amplifier circuit 44 which converts them to a voltage signal at a suitable level for further processing. The voltage signal is supplied to rectifier 46 and the rectified signal is supplied to an integrator 48, all of conventional form.

In response to signals from the traverse unit processor 36, the integrator 48 integrates the rectified signal received from the rectifier 46 as the stylus tip is dragged along the measurement path across the surface 2 of the workpiece 4 for a set period of time. The person skilled in the art will appreciate that the level of the integrated signal will be indicative of the roughness of the surface 2.

The integrated signal is supplied to an analogue-to-digital converter (ADC) 50 which converts the integrated signal to a digital signal forming a measurement value indicative of the roughness of the surface 2 and supplies the digital signal to the traverse unit processor 36. The traverse unit processor 36 then sends the measurement value to the control unit processor 30 via the infra-red link 32, 34 and the control unit processor 30 supplies a display signal to the display 10 so that the measurement value is displayed to the user.

In this embodiment, all the elements of the traverse unit 12 are identical to the corresponding elements of the SURTRONIC 10 except for the traverse unit processor 36 and traverse unit IR module 34.

In this embodiment, the control unit IR module 32 and the traverse unit IR module 34 are both RPM-800CBL integrated circuit chips which are available from Rohm Co., Ltd. of Japan. The RPM-800CBL comprises modulation circuitry, an LED driver and a light emitting diode for transmitting information and a photodiode and demodulation circuitry for receiving information. The RPM-800 CBL is compatible with both the IrDA and ASK communication systems. In this embodiment, the IrDA communication system is employed.

The RPM-800CBL integrated chip includes a power down mode which allows low current consumption when the instrument is not being used thereby extending battery life. In this embodiment, the control unit 6 is switched on by pressing the button 8 once and the traverse unit 12 is switched on in response to an IR signal sent by the control unit 6 when the button 8 is pressed a second time. It will be appreciated that separate IR transmitters and receivers could be used for switching on the traverse unit 12 from those used during the measurement operation as these are independent functions.

The RPM-800CBL integrated chip also includes an echo facility to enable confirmation that a signal has been safely received. With the echo facility, when a signal transmitted by a first chip is received by a second chip, the second chip re-transmits the signal back to the first chip which can then compare the re-transmitted signal with the originally transmitted signal to verify safe receipt.

In this embodiment, the control unit processor 30 and traverse unit processor 36 are PIC17C4LA 8-bit CMOS processors available from PIC Microsystems.

A second embodiment of the present invention will now be described with reference to FIGS. 3 to 6. Identical components to those described in the first embodiment have been referenced using the same numerals as for the first embodiment. The user-interface or control unit 6 and the measurement or traverse unit 12 of the second embodiment are multi-faceted bodies, in particular parallelepipeds having six surfaces, three being visible for each of the control unit 6 and traverse unit 12 in FIG. 3.

Figure 3:
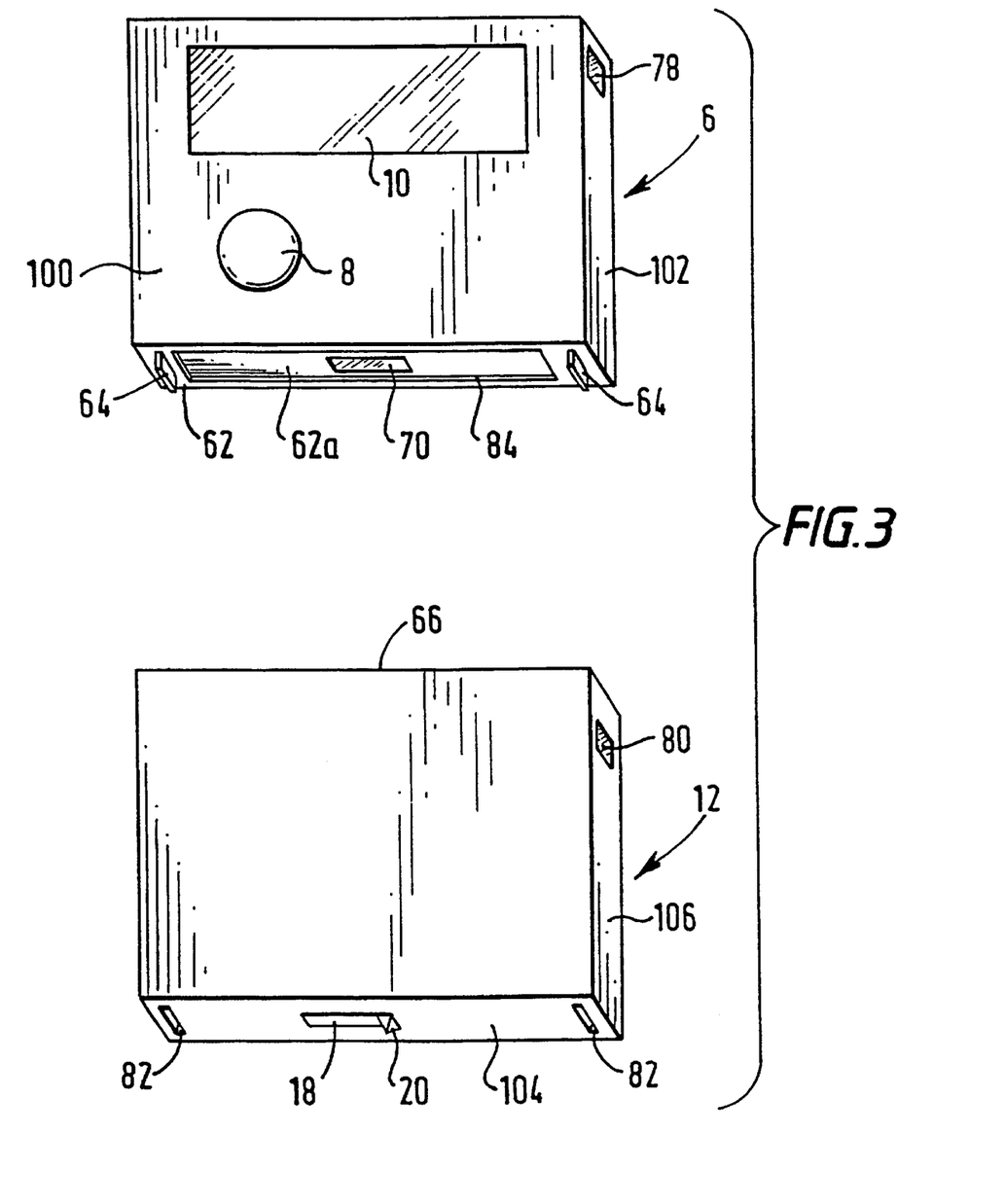
FIG. 3 shows an oblique projection of a second embodiment of the metrological instrument according to the present invention.
Figure 4:
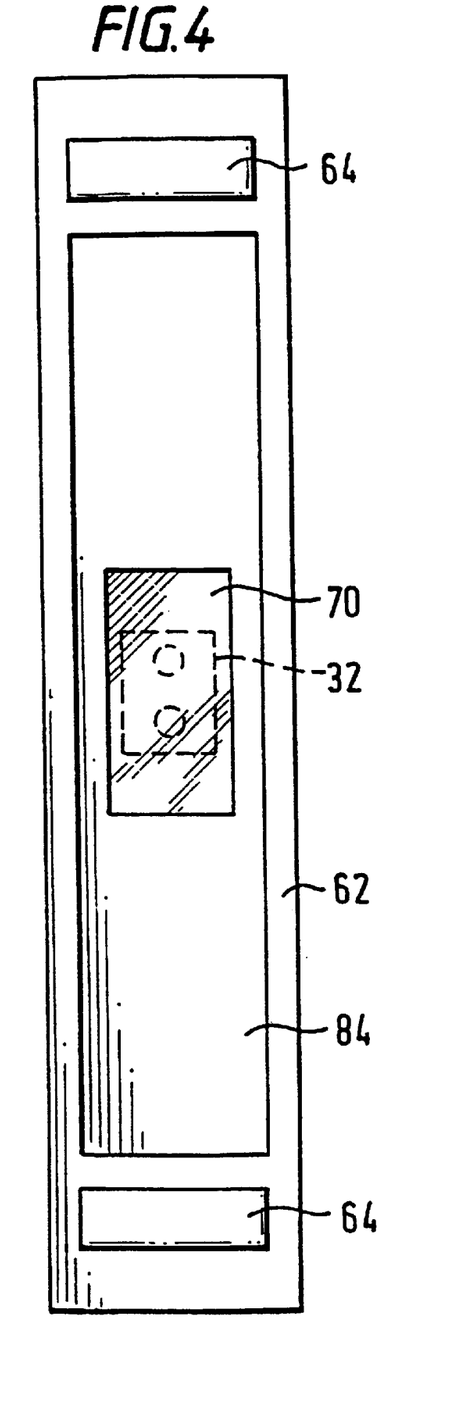
FIG. 4 is a plan view of a surface of the control unit of the second embodiment.
Figure 5:
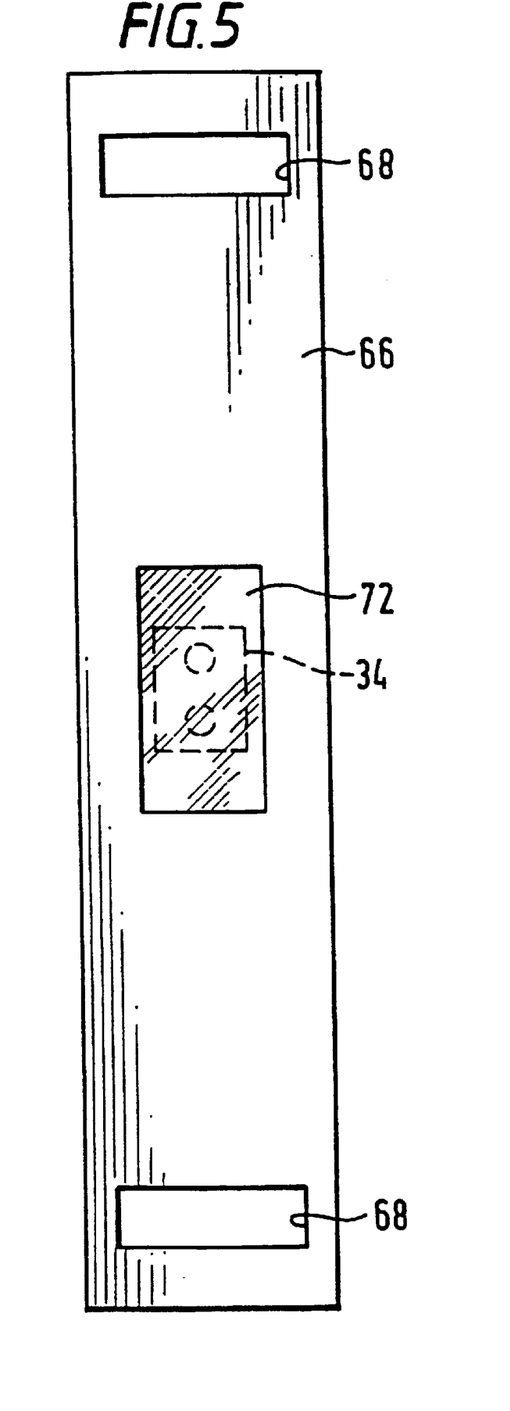
FIG. 5 is a plan view of a surface of the traverse unit of the second embodiment.

Referring now to FIGS. 3 to 5, the button 8 and the display 10 are mounted on one surface 100 of the control unit 6. A first IR transmissive window 70 is located on a surface 62 adjacent the surface 100. The control unit IR module 32 is positioned behind the first window 70 as can be seen in FIG. 4 where the control unit IR module 32 has been indicated in dashed lines.

A second IR transmissive window 78 is located in a surface 102 of the control unit 6, which is disposed adjacent to and at right angles to the surfaces 100 and 62. A second control unit IR module (not shown in FIG. 3) is located behind the second window 78.

As shown in FIG. 3, the stylus tip 20 carried by the stylus arm 18 protrudes from a surface 104 of the traverse unit 12. As illustrated in FIG. 5, a window 72 is located in a surface 66 of the traverse unit 12 opposite to the surface 104. The traverse unit IR module 34 is located behind the window 72 as indicated by dashed lines in FIG. 5. A window 80 is located in a surface 106 extending perpendicularly of and adjacent to both the surfaces 104 and 66. Although not shown in FIG. 3, a second traverse unit IR module is located behind the window 80.

In the second embodiment the control unit 6 and the traverse unit 12 are connectable. Two projections 64 are located on the surface 62 of the body of the control unit 6, as illustrated in FIG. 3 and FIG. 4, and two corresponding recesses 68 are formed in the surface 66 of the body of the traverse unit 12 as shown in FIG. 5 such that each of the projections 64 can engage with a respective different one of the recesses 68 to connect the control unit 6 and the traverse unit 12.

The windows 70 and 72 and the IR modules 32 and 34 are arranged such that, when the projections 64 are located in the recesses 68, the windows 70 and 72 are opposed to one another enabling the control unit IR module 32 behind the window 70 to communicate with the traverse unit IR module 34 behind the window 72. This enables, when the position of the surface to be measured is not difficult to reach, a measurement to be made while the control and traverse units are connected together using the same data communication arrangement as when a measurement is made with the control unit located remotely from the traverse unit.

Figure 6:
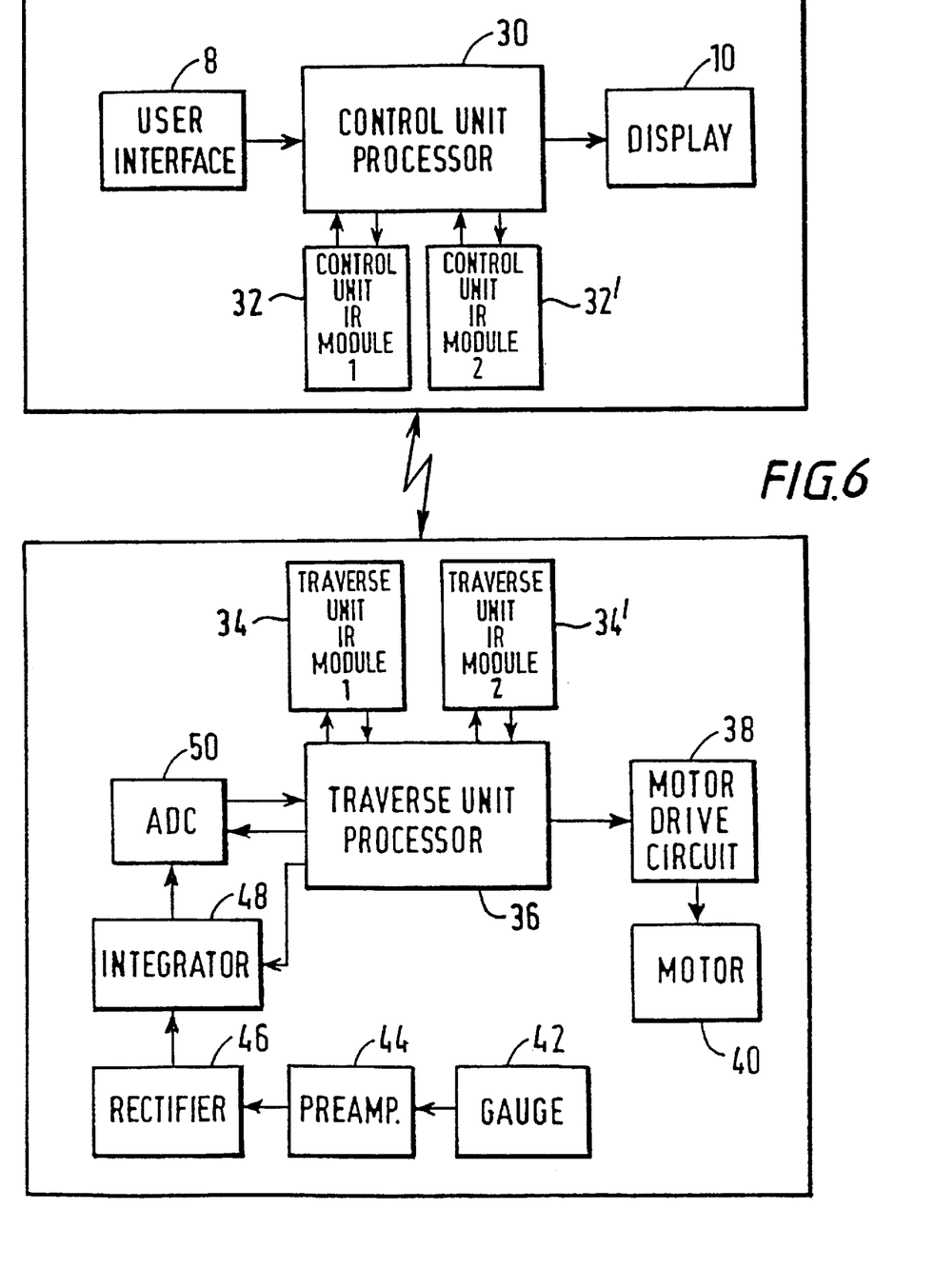
FIG. 6 is a very schematic block diagram of the circuitry incorporated in the control unit and traverse unit of the metrological instrument shown in FIG. 3.
Figure 7:
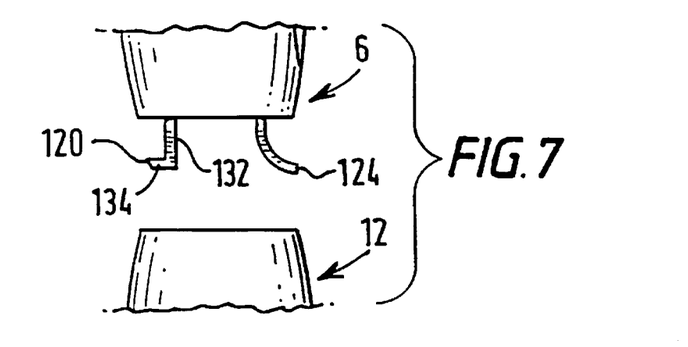
FIG. 7 shows a side view of part of the control unit and part of the measurement unit of another embodiment having different connection means.
Figure 8:
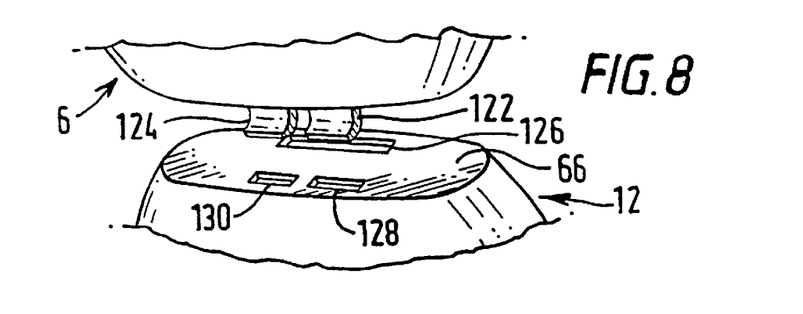
FIG. 8 shows a perspective view of part of the control unit and part of the measurement unit shown in FIG. 7 in which the top of the measurement unit can be seen.

As shown in FIG. 6, the circuitry of the control unit 6 and the traverse unit 12 of the second embodiment differs from that in the first embodiment in that first and second IR modules 32 and 32' are incorporated in the control unit 6 and first and second IR modules 34 and 34' are incorporated in the traverse unit 12. As described above with reference to FIG. 3, the first IR module 32 of the control unit 6 is located behind the window 70 and the first IR module 34 of the traverse unit 12 is located behind the window 72 while the second IR module 32' of the control unit 6 is located behind the window 78 and the second IR module 34' of the traverse unit 12 is located behind the window 80.

Figure 2:
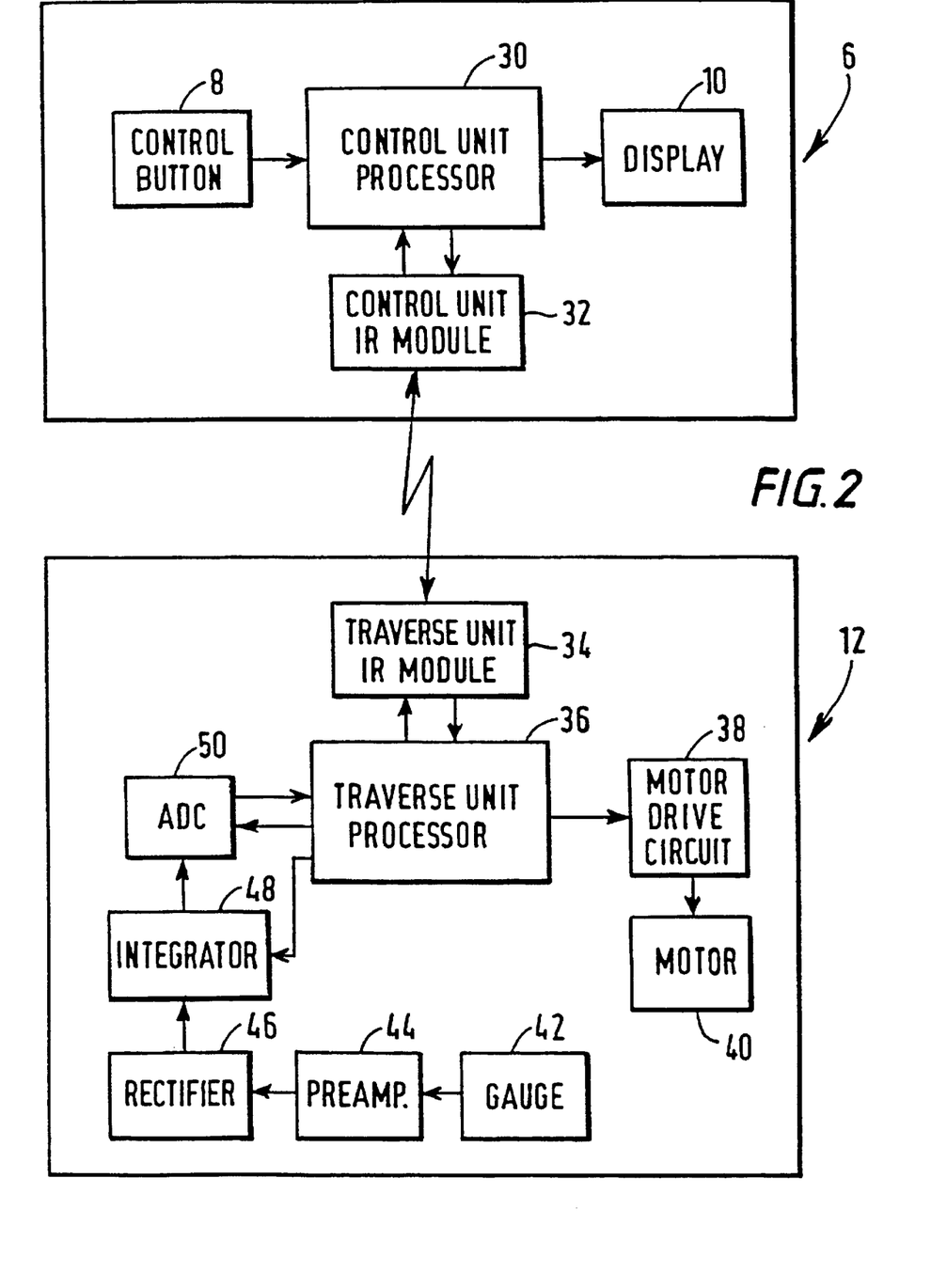
FIG. 2 is a very schematic block diagram of the circuitry incorporated in a user-interface or control unit and a measurement or a traverse unit of the metrological instrument shown in FIG. 1.

The metrological instrument shown in FIGS. 3 to 6 operates in the same manner as the instrument shown in FIGS. 1 and 2 with the exception that the instrument shown in FIGS. 3 to 6 enables the control and traverse units to be connected together in such a way that measurements can be made and communication effected in the same manner as would be used if the units were remotely located from one another. Also, with the instrument shown in FIGS. 3 to 6, when either the control or traverse unit wishes to transmit information, a signal containing the information is first transmitted by one of the two IR modules of that unit. If that IR module does not detect an echo signal then the information will be transmitted again using the other of the two IR modules. In this way, the chance of there being a line of sight between a transmitter in one unit and a receiver on another unit, thus enabling information to be transmitted between the two units, is increased.

As can be seen in FIG. 3, in this embodiment an additional two recesses 82 are located in the surface 76 from which the stylus tip 20 protrudes. The recesses 82 are arranged such that the projections 64 in the surface 62 of the body of the control unit 6 can be located in them to connect the control unit 6 and the traverse unit 12 so that the surface 62 of the control unit is opposed to the surface 104 of the traverse unit. Thus, when not in use, the control unit 6 and the traverse unit 12 can be connected in such a way that the body of the control unit 6 protects the stylus tip 20 from damage.

As shown in FIG. 3 an indentation 62*a* is provided in the surface 62 of the body of the control unit 6 to accommodate the stylus tip 20.

A number of modifications can be made to the above-described embodiments without departing from the inventive concept of the invention. Some of these modifications will now be described.

It will be appreciated that it is not necessary for the invention that the metrological instrument utilises a piezo-electric transducer to make a measurement. Other possible transducers include, for example, an inductive transducer, a capacitive transducer or an interferometric measurement system.

In the above embodiments, a signal is transmitted from the control unit to the traverse unit to initiate a measurement by the traverse unit of a measurement surface and a measurement value indicative of the surface roughness of measurement surface is transmitted from the traverse unit to the control unit via an IR link. In other metrological instruments, additional information may be transferred between the traverse unit and the control unit without departing from the concept of the invention. Processing of the raw data from the transducer may be carried out either by the traverse unit processor 36 or the control unit processor 30. For example, the height of the measurement surface at a plurality of points along a traverse line of the stylus tip 20 may be transmitted to the control unit for further processing.

The above embodiments describe pocket-sized battery-operated metrological instruments. The skilled person will appreciate that the inventive concepts described above can also be applied to mains-powered instruments. Further, neither the control unit nor the traverse unit need be pocket-sized, although it is anticipated that the invention will find particular application in the case where at least the traverse unit is manually portable.

In the above described embodiments, the traverse measurement unit and the control or user-interface unit have right parallelepipedal housing. It will, however, be appreciated that in the first embodiment the measurement unit and user interface unit may have any desired form or shape. In a second embodiment, the housings of the user interface unit and measurement unit may again have any desired shape or form provided, of course, that the two units provide surfaces corresponding to the surfaces 62, 66 and 104 which can co-operate with one another to enable connection of the two units as described above.

Also, in the case of the second embodiment, where protection of the stylus tip or other measurements sensor is not critical, then the recesses 82 may be omitted. It will also be appreciated that any other suitable form of connection means may be used, for example latches, screws, a magnetic or sliding coupling, an adhesive coupling, Velcro (Registered Trade Mark) or the like, but that the use of projections and recesses provides a simple way to connect the two units. Also, the locations of projections and recesses could, of course, be reversed.

Another form of connection means is illustrated in FIGS. 7, 8, 9 and 10. As can be seen most clearly in FIG. 8, three holes 126, 128 and 130 are formed in the surface 66 of the traverse unit 12. As can be seen most clearly in FIG. 9, an L-shaped projection 120 having a long arm 132 and a short arm 134 and two curved projections 122 and 124 extend from the surface 62 of the control unit.

Figure 9:
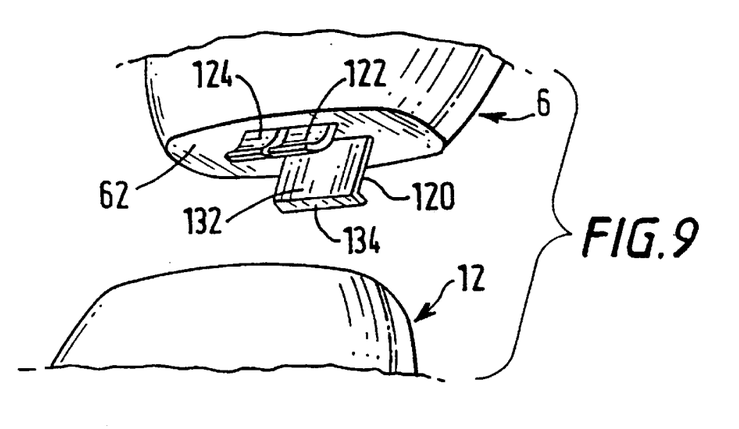
FIG. 9 shows a perspective view of part of the control unit and part of the measurement unit shown in FIG. 7 in which the bottom of the control unit can be seen.

The curved projections 122 and 124 are made of a rigid material and are arranged so that they can be inserted into the holes 128 and 130 respectively. The long arm 132 of the L-shaped projection 120 is connected to the surface 62 and the short arm 134 projects away from the centre of the surface 62.

Figure 10:
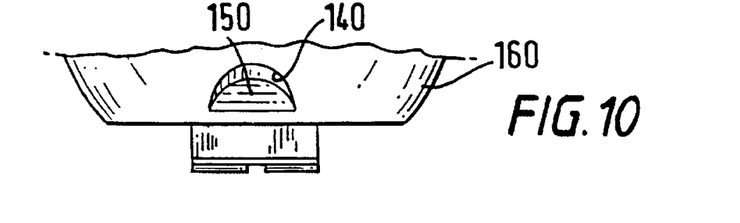
FIG. 10 shows a rear view of part of the control unit shown in FIG. 7.

The L-shaped projection 120 is mounted to the interior of the control unit housing so as to be pivotable towards the curved projections 122 and 124 but so as to be biassed away from the curved projections. As shown in FIG. 10 a part 150 of the mounting means of the projection 120 is visible through a cut-out 140 formed in the control unit housing 160 so that a user can use a finger to push the projection 120 against the biassing force towards the curved projections 122 and 124 to a position in which the projection 120 can pass through the hole 126 while the curved projections 122 and 124 pass through the holes 128 and 130 respectively to attach or separate the control unit 6 and the transverse unit 12. When the projections are received in the holes 10, 128 and 126, the L-shaped projection 120 returns to the position to which it is biassed and the short arm 134 of the L-shaped projection 120 engages the inside of the surface 66 to prevent the control unit 6 from being separated from the traverse unit 12. The control and traverse units may be separated by a user depressing the portion 150 to move the projection 120 away from its biassed position. Movement of the projection 120 away from its biassed position in order to couple or decouple the units may also be achieved by pivoting the control unit relative to the measurement unit.

Also it will be appreciated that any form of user operable switch or switches could be used, in place of the button 8. The control or interface unit may also be provided with a memory for storing measurement data and further communication means for enabling transmission of measurement data to, for example, a personal computer or the like.

In the above-described embodiments, the control unit is associated with a single traverse or measurement unit. However, a single control unit may be associated with a plurality of measurement units that may be located at different positions on a workpiece. Such measurement units may be located in a frame which maintains them at fixed relative distances and allows all of the measurement units to be moved together. Alternatively, the measurement units may be individually movable. A user may then move around the workpiece taking the control unit from one measurement unit to the next to obtain measurements from each measurement unit.

In the second embodiment, the control and measurement units each have two IR modules. It will, however, be appreciated that further IR modules may be incorporated in the units to increase still further the possible lines of sight between the units. In both the above embodiments, the control unit and the traverse unit communicate with each other via an infra-red link. However, other forms of remote communication may be used, for example radio telecommunications, ultrasound or any other known form of remote link, without departing from the inventive concept of the present invention.

Preferably, the control unit and the traverse unit are arranged so that, when the control unit and traverse unit are activated, signals are constantly or periodically sent between the control unit and the traverse unit to test whether there is a line of sight connection. If there is a line of sight connection a symbol is shown on the display 10. In this way, the user can see if there is a line of sight connection and if not can move the control unit around until a line of sight connection has been established.

The above-described embodiments incorporate IR modules in which modulation circuitry, transmitter driver circuitry, a transmitter, a receiver and demodulation circuitry are all mounted on a single integrated circuit. It will be appreciated by the skilled person that these components could be formed as discrete devices. Further, it will be appreciated that processors different to the specific processor used in the described embodiments could be used.

In the embodiments described above, the traverse or measurement unit traverses a pivotable stylus tip 20 across the surface to effect a measurement. However, it may also be possible to use an axially moveable stylus such that the entirety of the stylus moves in a direction toward or away from the surface as the stylus tip follows the surface. Also other types of measurement sensors may be used such as non-contact measurement sensors, for example capacitive, ultrasonic, atomic force or interference measurement sensors. The traverse unit may be adapted to measure roundness or surface form.

What is claimed is:

1. A metrological instrument for measuring a characteristic of a surface of a workpiece, the instrument comprising:
   a manually portable measurement unit arranged to be placed on a surface to be measured, the measurement unit having a sensor support for carrying a sensor to enable the sensor to sense a surface characteristic when the measurement unit is placed on the surface and a deriver operable to derive a signal indicative of a surface characteristic sensed by the sensor; and
   a user interface unit separate from the measurement unit and having an indicator operable to provide a user with an indication of the surface characteristic sensed by the sensor, each of the measurement unit and the user interface unit having a communicator enabling remote communication of information relating to a measurement between the measurement and user interface units.

2. An instrument according to claim 1, wherein each of the communicators comprises a plurality of communication devices oriented in different directions to one another.

3. An instrument according to claim 1, wherein at least one of the communicators comprises a verification circuit operable to verify communication between the units.

4. An instrument according to claim 1, wherein at least one of the communicators comprises an infra-red optical communicator.

5. An instrument according to claim 1, wherein each communicator comprises an integrated circuit comprising a transmitter circuit for transmitting a communication signal, a receiver circuit for receiving a communication signal, a modulator for modulating a signal to be transmitted and a demodulator for demodulating a received signal.

6. An instrument according to claim 1, wherein the measurement and user interface units have cooperating couplers for connecting the two units together.

7. An instrument according to claim 6, wherein the couplers are arranged to couple the measurement and user interface units together with a part of the user interface unit protecting the sensor to inhibit damage to the sensor when the measurement unit is not in use.

8. An instrument according to claim 6, wherein the couplers are arranged to couple the measurement and user interface units together with the communicator of the measurement unit facing the communicator of the user interface unit to enable communication between the two units when the two units are coupled together.

9. An instrument according to claim 6, wherein the couplers are arranged to couple the measurement and user interface units together in two different configurations such that, in a first configuration, a part of the user interface unit protects the sensor to inhibit damage to the sensor when the measurement unit is not in use and, in a second configuration, the communicator of the measurement unit is directed towards the communicator of the user interface unit to enable communication between the two units when the two units are coupled together.

10. A metrological instrument for measuring a characteristic of a surface of a workpiece, the instrument comprising:
    a manually portable measurement unit arranged to be placed on a surface to be measured, the measurement unit having a sensor support for carrying a sensor to enable the sensor to sense a surface characteristic when the measurement unit is placed on the surface and a deriver operable to derive a signal indicative of a surface characteristic sensed by the sensor; and
    a user interface unit separate from the measurement unit and having an indicator operable to provide a user with an indication of a surface characteristic sensed by the sensor, each of the measurement unit and the user interface unit having a communicator enabling remote communication of information relating to a measurement between the measurement and user interface units, and having a coupler enabling, when the measurement unit is not in use, coupling of the measurement and interface units together with the sensor protected by a least part of the user interface unit.

11. An instrument according to claim 10, wherein each of the communicators comprises a plurality of communication devices oriented in different directions to one another.

12. An instrument according to claim 10, wherein at least one of the communicators comprises a verification circuit operable to verify communication between the units.

13. An instrument according to claim 10, wherein each communicator comprises an infra-red optical communicator.

14. An instrument according to claim 10, wherein each communicator comprises an integrated circuit comprising a transmitter circuit operable to transmit a communication signal, a receiver circuit operable to receive a communication signal, a modulator operable to modulate a signal to be transmitted and a demodulator operable to demodulate a received signal.

15. An instrument according to claim 10, wherein the couplers comprise at least one projection and associated recess provided on cooperating surfaces of the measurement and user interface units so that when the two units are coupled together the at least one projection is received in the associated recess.

16. An instrument according to claim 10, wherein the user interface unit comprises a display for displaying an indication of a measurement made by the measurement unit to a user.

17. An instrument according to claim 10, wherein the user interface unit comprises a controller operable to enable a user to cause the measurement unit to initiate a measurement.

18. An instrument according to claim 10, wherein at least one of the user interface and the measurement units comprises a processor operable to process the signal provided by the sensor.

19. An instrument according to claim 10, wherein the measurement unit has a mover operable to move the sensor along a measurement path across the workpiece surface.

20. An instrument according to claim 10, wherein the measurement sensor comprises a pivotally mounted stylus carrying a stylus tip.

21. An instrument according to claim 10, wherein the measurement unit houses a datum bar carrying a carriage, a stylus pivotally mounted to the carriage and carrying a stylus tip, and a motor for driving the carriage along the datum bar to cause the stylus tip to follow a measurement path across the workpiece surface when the measurement unit is mounted on the workpiece surface.

22. An instrument according to claim 10, wherein said deriver comprises a piezoelectric transducer.

23. A metrological instrument for measuring a characteristic of a surface of a workpiece, the instrument comprising:
   a manually portable measurement unit arranged to be placed on a surface to be measured, the measurement unit having a sensor support for carrying a sensor to enable the sensor to sense a surface when the measurement unit is placed on said surface and a deriver operable to derive a signal indicative of a surface characteristic sensed by the sensor; and
   a user interface unit separate from the measurement unit and having an indicator operable to provide a user with an indication of a surface characteristic sensed by the sensor, each of the measurement unit and the user interface unit having a communicator enabling remote communication of information relating to a measurement between the measurement and user interface units and each of the measurement unit and the user interface unit also having a coupler enabling coupling of the measurement and user interface units together with the communicator of the measurement unit directed towards the communicator of the user interface unit to enable communication between the two units by the communicators when the two units are coupled together.

24. A metrological instrument for measuring a characteristic of a surface of a workpiece, the instrument comprising:
   a manually portable measurement unit arranged to be placed on a surface to be measured, the measurement unit having a sensor support for carrying a sensor to enable the sensor to sense a surface when the measurement unit is placed on the surface and a deriver operable to derive a signal indicative of a surface characteristic sensed by the sensor; and
   a user interface unit separate from the measurement unit and having an indicator operable to provide a user with an indication of a surface characteristic sensed by the sensor, each of the measurement unit and the user interface unit having a communicator enabling remote communication of information relating to a measurement between the measurement and user interface units, and each of the measurement unit and the user interface unit having a coupler enabling coupling of the measurement and user interface units together in two different configurations such that, in a first configuration, a part of the user interface unit protects the sensor to inhibit damage to the sensor when the measurement unit is not in use and, in a second configuration, the communicator of the measurement unit is directed towards the communicator of the user interface unit to enable communication between the two units when the two units are coupled together.

25. An instrument according to claim 24, wherein the couplers are provided by at least one projection or recess provided on a surface of the user interface unit carrying the communicator of the user interface unit, at least one recess or projection provided on a first surface of the measurement unit carrying the communicator of the measurement unit and at least one recess or projection provided on a second surface of the measurement unit carrying the sensor such that in the second configuration the projection or recess on said surface of the user interface unit cooperates with the recess or projection provided on the first measurement unit surface and in the first configuration the projection or recess on said surface of the user interface unit cooperates with the recess or projection provided on the second measurement unit surface.

26. A manually portable measurement unit for metrological instrument for measuring a characteristic of a surface of a workpiece, the measurement unit being configured to be placed on a surface to be measured and the measurement unit comprising:
   a sensor support for carrying a sensor to enable the sensor to sense a surface characteristic when the measurement unit is placed on the surface;
   a deriver operable to derive a signal indicative of a surface characteristic sensed by the sensor;
   a communicator enabling remote communication of information relating to a measurement between the measurement unit and a separate user interface unit for providing a user with an indication of a surface characteristic sensed by the sensor; and
   a coupler enabling, when the measurement unit is not in use, coupling of the measurement unit to the interface unit with the sensor protected by at least part of the user interface unit.

27. A unit according to claim 26, wherein the communicator comprises a plurality of communication devices oriented in different directions to one another.

28. A unit according to claim 26, wherein the communicator comprises a verification circuit operable to verify communications between the units.

29. A unit according to claim 26, wherein the communicator comprises an infra-red communicator.

30. A unit according to claim 26, wherein the communicator comprises an integrated circuit comprising a transmitter circuit operable to transmit a communication signal, a receiver circuit operable to receive a communication signal, a modulator operable to modulate a signal to be transmitted and a demodulator operable to demodulate a received signal.

31. A unit according to claim 26, wherein the coupler comprises one of a projection and a recess provided on a surface of the measurement unit.

32. A unit according to claim 26, comprising a mover operable to move the sensor along a measurement path across the workpiece surface.

33. A unit according to claim 26, wherein the sensor comprises a pivotally mounted stylus carrying a stylus tip.

34. A unit according to claim 26, comprising a datum bar carrying a carriage, a stylus pivotally mounted to the carriage and carrying a stylus tip, and a motor for driving the carriage along the datum bar to cause the stylus tip to follow a measurement path across the workpiece surface when the measurement unit is mounted on the workpiece surface.

35. A unit according to claim 26, wherein the deriver comprises a piezoelectric transducer.

36. A manually portable measurement unit for use in a metrological instrument for measuring a characteristic of a surface of a workpiece, the measurement unit being arranged to be placed on a surface to be measured and the measurement unit comprising:
  a sensor support for carrying a sensor to enable the sensor to sense a surface characteristic when the measurement unit is placed on the said surface;
  a deriver operable to derive a signal indicative of a surface characteristic sensed by the sensor;
  a communicator enabling remote communication of information relating to a measurement with a communicator of a user interface unit separate from the measurement unit for providing a user with an indication of a surface characteristic sensed by the sensor; and
  a coupler enabling coupling of the measurement unit to the user interface unit with the communicator of the measurement unit directed towards the communicator of the user interface unit to enable communication between the two units when the two units are coupled together.

37. A manually portable measurement unit for use in a metrological instrument for measuring a characteristic of a surface of a workpiece, the measurement unit being arranged to be placed on a surface to be measured and the measurement unit comprising:
  a sensor support for carrying a sensor to enable the sensor to sense a surface characteristic when the measurement unit is placed on the surface;
  a deriver operable to derive a signal indicative of a surface characteristic sensed by the sensor;
  a communicator enabling communication of information relating to a measurement between the measurement unit and a separate interface unit for providing a user with an indication of a surface characteristic sensed by the sensor; and
  a coupling arrangement operable to couple the measurement unit to the user interface unit in two different configurations such that, in a first configuration, a part of the user interface unit protects the sensor to inhibit damage to the sensor when the measurement unit is not in use and, in a second configuration, the communicator of the measurement unit is directed towards a communicator of the user interface unit to enable communication between the two units when the two units are coupled together.

38. A unit according to claim 37, wherein the coupling arrangement comprises at least one of a recess and a projection provided on a first surface of the measurement unit, the first surface carrying the communicator of the measurement unit, arranged to cooperate with at least one of a projection and a recess provided on a surface of the interface unit carrying said communicator in the second configuration, and at least one of a recess and a projection provided on a second surface of the measurement unit, the second surface carrying the sensor, arranged to cooperate with said least one projection or recess provided on said surface of the interface unit in the first configuration.

39. A manually portable user interface unit for use in metrological instrument for measuring a characteristic of a surface of a workpiece using a manually portable measurement unit arranged to be placed on a surface to be measured and having a sensor support for carrying a sensor to enable the sensor to sense a surface characteristic when the measurement unit is placed on the surface and a deriver operable to derive a signal indicative of a surface characteristic served by the sensor, the user interface unit having an indicator operable to provide a user with an indication of a surface characteristic sensed by the sensor, a communicator enabling remote communication of information relating to a measurement with a communicator of the measurement unit and a coupler for coupling with the measurement unit to protect the sensor when the measurement unit is not in use.

40. A unit according to claim 39, wherein the communicator comprises a plurality of communication devices oriented in different directions to one another.

41. A unit according to claim 39, wherein the communicator comprises a verification circuit operable to verify a communication.

42. A unit according to claim 39, wherein the communicator comprises an infra-red communicator.

43. A unit according to claim 39, wherein the communicator comprises an integrated circuit comprising a transmitter circuit operable to transmit a communication signal, a receiver circuit operable to receive a communication signal, a modulator operable to modulate a signal to be transmitted and a demodulator operable to demodulate a received signal.

44. A unit according to claim 39, wherein the coupler comprises at least one of a projection and a recess arranged to cooperate with at least one of a recess and a projection of the measurement unit so that when the two units are coupled together the projection is received in the associated recess.

45. A unit according to claim 39, comprising a display operable to display an indication of a measurement made by the measurement unit to a user.

46. A unit according to claim 39, comprising a controller operable to enable a user to cause the measurement unit to initiate a measurement.

47. A unit according to claim 39, comprising a processor operable to process the signal provided by the sensor.

48. A manually portable user interface unit for use in metrological instrument for measuring a characteristic of a surface of a workpiece using a manually portable measurement unit arranged to be placed on a surface to be measured and having a sensor support for carrying a sensor to action the sensor to sense a surface characteristic when the measurement unit is placed on said surface and a deriver operable to derive a signal indicative of a surface characteristic sensed by the sensor, the user interface unit having an indicator operable to provide a user with an indication of a surface characteristic sensed by the sensor, a communicator enabling remote communication of information relating to a measurement with a communicator of the measurement unit, and a coupler operable to couple the interface unit to the measurement unit with the communicator of the interface unit directed towards a communicator of the measurement interface unit to enable communication between the two units by the communicators when the two units are coupled together.

49. A manually portable user interface unit for use in metrological instrument for measuring a characteristic of a surface of a workpiece using a manually portable measurement unit arranged to be placed on a surface to be measured and having a sensor support for carrying a sensor to enable the sensor to sense a surface characteristic when the measurement unit is placed on said surface and a deriver operable to derive a signal indicative of a surface characteristic sensed by the sensor, the user interface unit having an indicator operable to provide a user with an indication of a surface characteristic sensed by the sensor, a communicator enabling communication of information relating to a measurement with a communicator of the measurement unit and a coupling arrangement operable to couple the user interface unit to the measurement unit in two different configurations such that, in a first configuration, a part of the user interface unit protects the sensor to inhibit damage to the sensor when the measurement unit is not in use and, in a second configuration, the communicator of the interface unit is directed towards the communicator of the measurement unit to enable communication between the two units when the two units are coupled together.

50. A unit according to claim 49, wherein the coupling arrangement comprises at least one of a projection and a recess provided on a surface of the user interface unit carrying the communicator of the user interface unit and arranged to cooperate with at least one of a recess and projection provided on a first surface of the measurement unit, the first surface carrying the communicator of the user interface unit, in the second configuration and to cooperate with at least one of a recess and a projection provided on a second surface of the measurement unit, the second surface carrying the sensor, in the first configuration.

51. A manually portable metrological instrument having a measurement unit for measuring a surface characteristic of a workpiece surface and a separate user interface unit, the measurement unit having a housing with a first surface having a first window and a second surface having a second window, the first surface being arranged to contact a workpiece surface to support the measurement unit on the workpiece surface when a user places the measurement unit on the workpiece surface, the measurement unit housing containing a sensor located within the housing to sense the workpiece surface through the first window, a measurement deriver operatively coupled to the sensor to derive a measurement signal indicative of a surface characteristic sensed by the sensor and a measurement unit remote communications transceiver operatively coupled to the measurement deriver and positioned adjacent the second window to provide through the second window a communications signal representing a measurement signal derived by the measurement deriver, the user interface unit having a housing with a third window, the user interface unit housing containing a user interface unit remote communications transceiver positioned adjacent the third window to receive through the third window a communications signal provided by the measurement unit remote communications transceiver and a controller operatively coupled to the user interface unit remote communications transceiver and configured to control operation of the measurement instrument, the user interface unit housing having a display operatively coupled to the controller and configured to display display data representing a measurement signal to a user and also having a user operable switch operably coupled to the controller, the controller being configured, in response to operation of the user operable switch, to cause the user interface unit remote communications transceiver to transmit an instrument signal to the measurement remote communications transceiver and the measurement deriver being operable, in response to receipt of an instruction signal, to cause the sensor to commence a measurement operation.

52. A measurement instrument according to claim 51, wherein the user interface unit housing has a first surface arranged to cooperate with the first surface of the measurement unit housing, the first surface of the user interface unit housing and the first surface of the measurement unit housing having interlock elements configured to interlock to couple the user interface unit housing to the measurement unit housing to protect the sensor when the measurement unit is not in use.

53. A measurement instrument according to claim 51, wherein the sensor comprises a stylus and the housing contains a stylus mount to which the stylus is pivotally mounted.

* * * * *